Oct. 19, 1954     C. W. CHERRY     2,691,915
RIVET WITH EXPANDING MANDREL
Filed Nov. 13, 1950     2 Sheets-Sheet 1
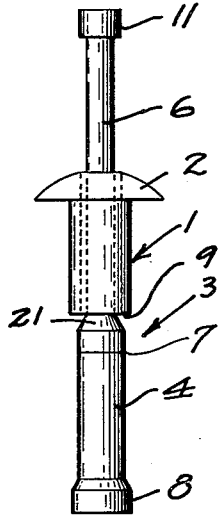
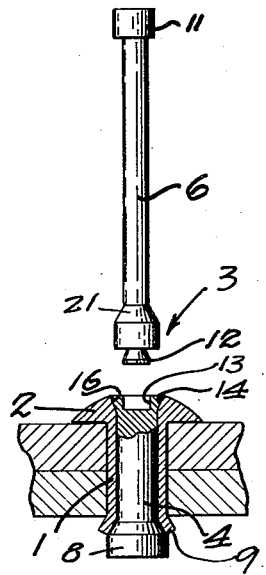
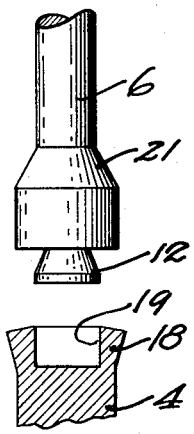
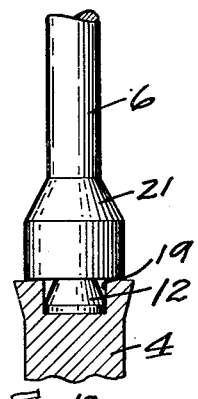
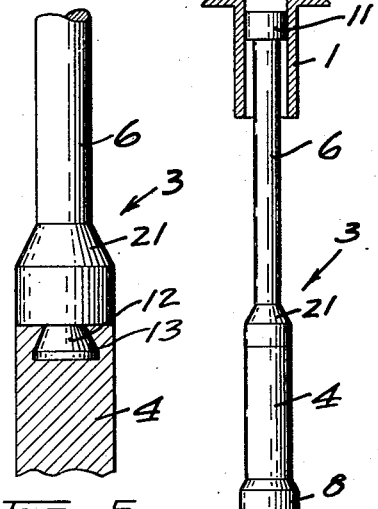
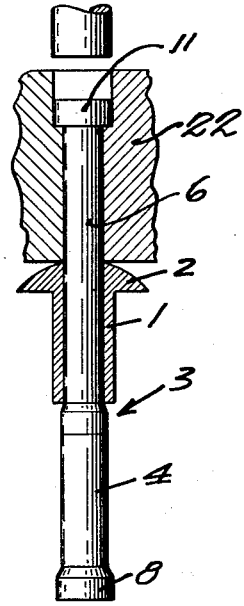
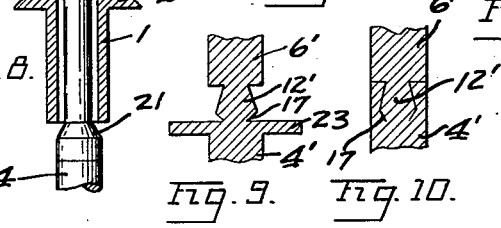
INVENTOR.
CARL W. CHERRY, DECEASED
BY LENA CHERRY, ADMINISTRATRIX
BY George B White
ATTORNEY

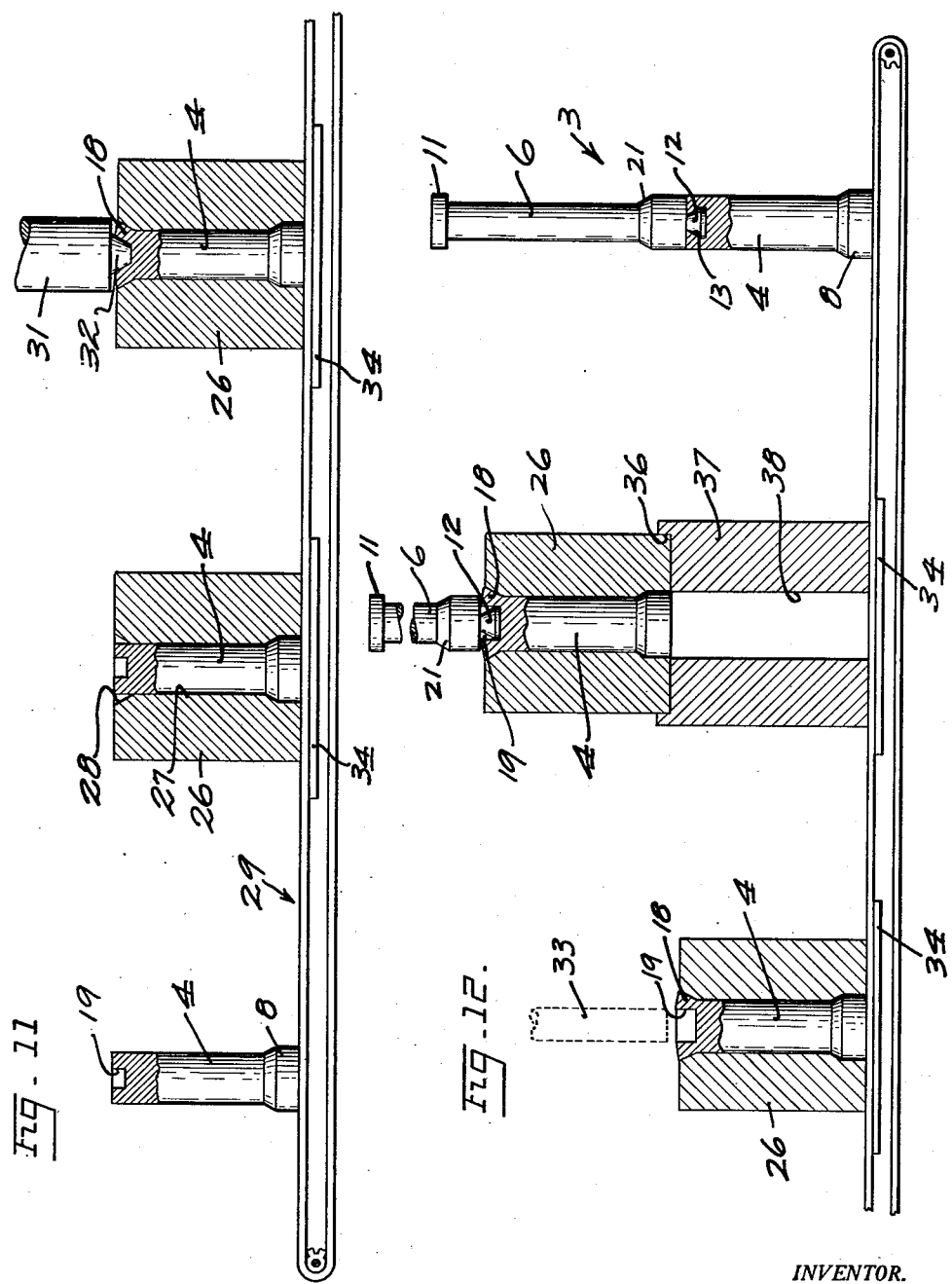

Patented Oct. 19, 1954

2,691,915

UNITED STATES PATENT OFFICE

2,691,915

RIVET WITH EXPANDING MANDREL

Carl W. Cherry, deceased, late of Carmel, Calif., by Lena Cherry, administratrix, Carmel, Calif., assignor to Townsend Company, New Brighton, Pa., a corporation of Pennsylvania Application November 13, 1950, Serial No. 195,344

9 Claims. (Cl. 85—40)

This invention relates to a rivet with expanding mandrel.

The invention is particularly directed to the type of rivets or rivet assemblies adapted for riveting from one side only of the objects to be secured together. Generally such rivet assembly includes a stem in a hollow rivet with a tail former on the tail end of the stem. The rivet can be secured in place by exerting pressure on the head of the rivet and an opposite pull on the stem and tail former for forming the rivet tail against the object to be riveted. A problem particularly solved by the herein invention is the holding of the rivet stem in the hollow rivet after the rivet is set thereby to plug the hollow rivet by the former stem. Heretofore the solution of this problem was attempted by the separate operation of compressing the rivet head against certain corrugtions or indentations in the rivet stem after the rivet has been set. In other instances, the rivet stem is held in place by friction, and the protruding portion of the rivet stem after setting is trimmed or cut off so as to provide a smooth surface at the rivet head. While the latter method provided a more practical solution to the problem than the separate operation for compressing the rivet head against the stem, nevertheless it still required a separate operation. In the methods where the rivet head is jammed or compressed against the rivet the obstacle or disadvantage arose in the necessity for a comparatively complicated and expensive tool and lack of certainty of uniformity of holding force and operation. In the method of cutting off the protruding portion of this stem, the disadvantage was the provision of a separate set of tools for cutting and trimming the stem at the rivet head, which again involved a separate operation.

The problem is solved by applicant's invention herein in such a manner as to eliminate the need for complicated tools and separate operations for locking or securing the rivet stem in the hollow rivet after the setting of the rivet. This is accomplished by making the rivet stem in two portions, one being separable from the other, the two portions being so united together as to operate as a unitary stem for setting the rivet and forming the tail of the rivet, but to separate from one another at a predetermined point after the rivet is set, and coincidentally with the separation of the portions to spread the rivet stem at about said point of separation in such a manner as to interlock with the rivet head and thereby be permanently held in said hollow rivet.

The primary advantage of this invention is the simplifying of the riveting operation by eliminating the additional steps heretofore required for either the securing of the rivet head to the inner stem or by the cutting or trimming of the projecting portion of the rivet stem.

Another advantage of the invention is the performing of the positive locking of the rivet stem into the hollow rivet simultaneously with and as part of the rivet setting operation without the necessity of any additional tools or instruments. The rivet setting can be performed by the same tools and riveting apparatus heretofore used and the locking of the stem after the setting of the rivet is accomplished by the step of riveting and at the moment of the separation of the outer portion of the rivet stem from that other portion which remains in the tubular rivet.

Another advantage of the invention is that the separable portions of the rivets can also determine the length of the stem which remains as a plug in the rivet after the riveting operation.

Still another advantage of the invention is the accomplishment of the plugging of the rivet and at the same time assuring the expansion of the hollow rivet so as to fill the hole through which the rivet extends.

Still another advantage of the invention is the efficient method for uniform riveting and uniform holding or retaining force.

It is understood that some changes may be made in the general arrangements and combinations of the several devices and parts, as well as in the details of the construction thereof without departing from the scope of the present invention as set forth in the following specification, and as defined in the following claims; hence the invention is not limited to the exact arrangements and combinations of the said device and parts as described in the said specification, nor confined to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a side view of a rivet assembly in which the stem is constructed in accordance with the invention;

Fig. 2 is a sectional view of the rivet assembly after the rivet tail is formed, showing the separable portion of the rivet stem separated, and the end of the remaining rivet portion spread into the rivet head;

Fig. 3 is a fragmentary view of the joining ends of the rivet stem portions in the first step of operation for joining the same;

Fig. 4 is a fragmentary partly sectional view showing the end of the removable stem portion in the hole of the other stem portion;

Fig. 5 is a partly sectional view showing the two portions of the stem joined together;

Fig. 6 is a partly sectional view illustrating the insertion of a stem with a performed pulling head through a hollow rivet;

Fig. 7 is a partly sectional view illustrating the forming of the pulling head on the rivet stem where the pulling head is larger than the inner diameter of the hollow rivet;

Fig. 8 is a partly sectional view showing the rivet stem in combination with a hollow rivet having a countersunk hole in the rivet head; and showing a straight pulling stem without a pulling head.

Fig. 9 is a sectional fragmental view of a modified form of the uniting of the two portions of the stem, from a piece machined for such uniting;

Fig. 10 is said modified form pressed and united together as a unitary stem, but separable stem.

Fig. 11 is a somewhat diagrammatic view showing the steps in the making of the plug portion of the stem; and Fig. 12 is a continuation of said diagrammatic view showing the assembling of the removable pulling portion of the stem in the plug part of the rivet stem.

The method of riveting in accordance with our invention includes the steps of connecting the stem of a rivet assembly in a hollow rivet by a joint which expands the portion of the stem within the rivet at the said joint upon the severing of said joint caused by the pulling force exerted on the rivet stem and after the forming of the tail of said rivet. In other words, the method of riveting with a rivet assembly having a hollow rivet through which a stem is extended with a tail former at the tail of the rivet, includes the connecting of two sections of the rivet stem by a joint at about a point spaced from the tail former to substantially the same distance as the gripping length of the hollow rivet so that said joint is within the head of the rivet after the rivet is set, then pulling the stem through the hollow rivet for forming the tail, and then by the same pulling force separating the outer section of the rivet stem from the plug section and simultaneously expanding the joint end of the plug section into locking relationship with a rivet head. The tendency of expanding the joints while the joint is pulled through the rivet, presses the joint against the rivet so as to expand the rivet to fill the hole in the work.

The novel rivet assembly includes a hollow tubular rivet 1 which has a head 2 at one end thereof. The head 2 may be of any suitable shape and form according to the purpose for which the rivet is used. Through the tubular rivet 1 extends a stem generally denoted by the reference numeral 3. This stem 3 is made in two sections, namely a plug section 4 and a pulling section 6 which are jointed together at an expandable and separable joint 7. On the outer end of the plug section 4 is provided a tail former 8 which is adapted to spread the tail end 9 of the hollow rivet 1 into a rivet tail when pulled thereagainst, as shown in Fig. 2. The joint 7 is spaced from the former 8 about the same distance as the distance between the proposed tail 9 and the head 2 of the rivet 1 so that the plug section 4 fits into the completed rivet 1 with its separated end substantially flush with the rivet head 2. The free end of the pulling section 6 of the stem 3 is provided with any suitable engagement means for a pulling tool. In the present illustration a straight stem with serrations 10 is shown in Fig. 8 and a pulling head 11 is shown in Fig. 1, for coaction with the usual pulling tools for setting so called blind rivets.

The joint 7 between the pulling section 6 and the plug section 4 of the rivet stem 3 is such that under the pulling force exerted on the stem when the movement of the plug section 4 is retarded, the joint has a tendency to expand into the rivet, and after it reaches into the head 2 of the rivet then it spreads the top of the plug section and severs the pulling section from the plug section. In the preferred form of the joint 7 as illustrated in Figs. 2 to 5 inclusive, the joining end of the pulling section 6 is provided with a substantially frusto-conical lug 12 which extends from the end of the pulling section 6 substantially axially. This frusto-conical lug 12 tapers away from the end of the pulling section 6 so that its smaller end is joined to the pulling section 6. The base of the plug extends into a correspondingly frusto-conical socket or recess 13 in the top of the plug section 4 as shown in Fig. 5 and Fig. 10. While the rivet stem is pulled through the rivet 1 the walls of the passage in the hollow rivet 1 prevent the spreading of the top of the plug section 4 and an outward lateral force is exerted on the hollow rivet 1 for filling the rivet hole completely.

The normal so-called blind riveting operation is performed by pulling the stem so that the tail former 8 thereof spreads the tail of the rivet to the desired extent to set the rivet in place. When the joint 7 reaches the outer portions of the rivet head 2, the material of that edge of the rivet head 2 can be flown or pressed outwardly, and thus the pulling force, after the setting of the rivet, pulls the lug 12 out of the pocket 13 and, by reason of the inverted conical arrangement in the pocket 13, it pushes the walls of said pocket 13 outwardly and spreads the adjacent portions of the plug section 4 into the end of the hole in the rivet head 2. This forms a retaining head 14, as shown in Fig. 2, positively engaging the rivet head 2 and preventing the removal of the plug section 4 from the rivet head 1 under any normal structural stress conditions.

In order to render this spreading action still more uniform in desired instances, the outer end of the passage through the rivet 1 in the rivet head 2 is countersunk, as shown in Fig. 8, and the retaining head 14 on the plug section 4 is spread into this countersunk seat 16. It is to be noted that the separation of the pulling section 6 from the plug section 4 of the stem 3 occurs always at about the same predetermined point which corresponds to the gripping length of the rivet 1, and therefore leaves a smooth surface in the rivet head with a central recess without the necessity of any further cutting or trimming.

In the forms shown in Figs. 9 and 10 the base of the conical lug 12 is integrally united with plug section 4 and is weakened or cut in at its base 17 so as to break at said base 17 under the said pulling force after the rivet is set. In other respects the operation is the same as heretofore described in connection with the first form of the invention.

The method of making rivet stems for such a rivet assembly is illustrated in Figs. 3, 4 and 5. This particularly illustrates the forming of the joint. It is to be noted that rivets of this type are made of various kinds of material. While the plug section 4 and the pulling section 6 may be both made of the same material, it was found preferable in many instances to have the pulling section 6 made of different material than that of the plug section 4. For instance, if the rivet is an aluminum rivet and the plug section is made of certain aluminum alloy, then the pulling section 6 can be made of steel or of harder material than the plug section 4, so that the top of the plug section would be definitely spread apart when the lug is pulled out of its plug socket. Such steel pulling sections can be recovered and reused.

The first step is to form the plug section of the regular stem diameter corresponding to the inner diameter of the passage in the tubular rivet. On one end of this plug section 4 is formed the tail former 8. The other end of the plug section 4 is made initially flared outwardly as shown in Fig. 3 substantially corresponding to the angle of the cone of the pulling lug. Into the center of this flared end 18 of the plug section 4 is drilled, or otherwise formed, a hole 19 generally of an over-all diameter corresponding to the diameter of the base of the frusto-conical lug 12. It is also preferable that the pulling stem 6 be thinner than the plug section 4 and at the end adjacent to the lug 12 of a diameter corresponding to the outer diameter of the plug section 4, and be provided with a tapered shoulder 21 to facilitate the entry of the stem into the passage of the tubular rivet. The end of the pulling section 6 thus formed is then inserted into the recessed end 18 of the plug section 4 so that the lug 12 is within the recess 19 in the manner illustrated in Fig. 4.

In the next step the outwardly tapering end 18 of the plug section 4 is circumferentially compressed so as to bring that portion to the same outside diameter as the diameter of the plug section 4 and thereby to flow and force the walls of the material around the frusto-conical lug 12 to form the aforementioned frusto-conical recess in tight engagement with the lug 12 as shown in Fig. 5. The joint 7 thus formed unites the plug section 4 and the pulling section 3 which unit can be assembled in the usual manner.

As shown in Fig. 6 the pulling head 11 is preformed on the pulling section 6 so it can extend through the passage of the tubular rivet 1.

As shown in Fig. 7 the head may be formed after the assembly of the stem in the rivet in any suitable manner, for instance in split die 22 of usual design.

As shown in Fig. 8 the stem may be straight with grip or pulling serrations 10.

The making of the forms shown in Figs. 9 and 10 include a machining operation instead of the assembly operation between the pulling section and the plug section of the rivet stem. A stem is machined substantially in the shape at an intermediate portion as illustrated in Fig. 9. The plug section 4 is of the stem diameter and at said intermediate portion is formed with an outwardly extended circular flange 23 above which is formed a frusto-conical lug 12' on the bottom of the pulling section 6' of the stem. The base of the frusto-conical lug 12' has an undercut groove 17 as heretobefore described, so as to present a weakened connecting portion just above the flange 23 and thereby determine the breaking or separation point between the pulling section 6' and the plug section 4'. After the unit is so machined the same is pushed through a suitable die or otherwise suitably treated to bend up the flanges 23 into the position shown in Fig. 10, whereby the material flows around the frusto-conical lug 12' and the outer periphery of the stem becomes continuous, but providing therein the separable joint or connection.

A particular embodiment of the method of making the separable rivet stems in accordance with our invention is illustrated in Figs. 11 and 12. As heretofore described, according to the invention in the first form the stem of each rivet is formed out of a plug section 4 and a removable pulling section 6. The plug section 4 is formed in the same manner as the lower ends of the regular rivet stems in this type of rivets, with a tail former 8 at the tail end, excepting that it is cut short substantially to the grip length of the tubular rivet 1. A hole 19 is drilled in the cut off end of the plug section 4. This plug section 4 is then placed into an accurately formed snug fitting die 26. The bore 27 of this die 26 terminates at its upper end at a countersunk tapered recess 28 which corresponds to the desired outward taper of the preformed end of the plug section 4. This die 26 is placed over the plug section 4 as it is carried on a conveyor indicated at 29 and then the plug section with the die 26 thereon is carried under a punch 31 which latter is pressed down into the hole 19 of the plug section. The punch 31 has a tapered punch end 32 which when pressed into the hole 19 spreads it apart so as to flare the end of the plug section outwardly into the flared or countersunk recess 28 of the die. Then the punch is removed and in its place a drill is applied as indicated in broken lines at 33 in Fig. 12. This drills a hole into the flared end which hole is of the same width as the larger diameter or base of the conical extension 12 at the lower end of the pulling section 6.

Throughout these previous steps the die and the forming head of the stem rest upon a solid surface as indicated at 34. Then the die 26 with the plug section 4 therein is lifted and is placed in position in a recess 36 of a spacer block 37. This spacer block 37 has in it an axial bore 38 of sufficiently large diameter to allow the entire stem to pass through the same. The pulling section 6 is then placed in position so that the frusto-conical extension 12 is placed into the hole 19 in the end of the plug section and then pressure is applied to the top of the pulling section 6 to push both sections of the stem through the bore 2 of the die 26 and into the larger bore 38. On account of the pushing of the flared end 18 of the plug section through the cylindrical bore 27 of the die 26, this flared portion 18 will be closed up and pressed together and over the conical extension 12 of the pulling section 6 thereby forming a solid unit out of the plug section and the pulling section. This completed stem 3 may be then either dropped through a suitable hole on the conveyor system 29 or the die 26 and block 36 may be removed from the same for the next operation. In using this method in an automatically progressing machinery the plug section of the rivet can be inserted in the die and then the die is carried around the so-called upsetting machine opposite to the respective tools such as the spreading punch, then the drill. The chain of the machine then carries the individual dies 26 with the plugs in it first under the punch to spread the end into the flare, secondly under the drill to drill the right size hole into the flared end of the plug section, and thirdly under the plunger and assembly point where the pulling portion of the stem is inserted in the flared end of the plug section, and finally under the pressure element where the assembled section is pushed through the die and discharged through the larger bore of the spacer block or other bore from the machine.

I claim:

1. A fastener assembly comprising a tubular element, a pulling section and a plug section joined together end to end forming a stem positioned within said tubular element, a former larger than the bore of said tubular element on the free end of the plug section to enlarge the adjacent end of said tubular element into a tail when said stem is pulled relatively to said tubular element, and said joint between said sections comprising means axially separable and adapted to expand the joining end of said plug section when said stem is pulled axially with respect to said tubular element, said joint being of a firmness resisting said separation until after said tail is formed.

2. In a fastener assembly having a tubular element, a stem extending through said tubular element and being adapted to be pulled into said element, said stem comprising a pulling section to be operatively connected to a pulling device and a plug section having means to enlarge the end of said tubular element, an expansible socket on the end of said plug section, a head on and axially extending from the adjacent end of said pulling section, said head having a tapered side converging from its outer end toward its root on said end of said pulling section and being embedded in said socket, said head and said socket filling the cross section of the bore through said tubular element, said head being interlocked with said socket for joining said sections into a single stem resisting separation of said sections during pulling of said pulling section, while said socket is inside said tubular element, said socket being prevented from expanding by contact with the walls of said bore of said tubular element, and permitting in the final pulling position of said stem, when said socket has arrived at the end of said bore of said tubular element and is free from contact with said walls of said bore of said tubular element, separation of said sections due to spreading of said socket and releasing of said head held therein under continued pulling of said pulling section.

3. In a fastener assembly according to claim 2, wherein said pulling section has generally a smaller cross section than that of said bore through said tubular element, wherein the end of said pulling section at said head is enlarged to substantially the same cross section as said bore, and wherein said enlarged end of said pulling section is provided with a shoulder tapering from said enlargement to said generally smaller cross section of said pulling section.

4. In a fastener assembly having a tubular element, a stem extending through said tubular element and being adapted to be pulled into said element, said stem comprising a pulling section to be operatively connected to a pulling device and a plug section having means to enlarge the end of said tubular element, and expansible socket on the end of said plug section, a head on and axially extending from the adjacent end of said pulling section, said head having a wedge-shaped side surface directed downwardly and laterally outwardly from its base on said pulling section end and being embedded in said socket, said head and said socket filling the cross section of the bore through said tubular element, said head being interlocked with said socket for joining said sections into a single stem resisting separation of said sections during pulling of said pulling section, while said socket is inside said tubular element being prevented from expanding by contact with the walls of said bore of said tubular element, and permitting in the final pulling position of said stem, when said socket has arrived at the end of said tubular element and is free from contact with said walls of said bore of said tubular element, separation of said sections due to spreading of said socket and releasing of said head, held therein, under continued pulling of said pulling section.

5. In a fastener assembly according to claim 4, wherein said bore of said tubular element is flared outwardly at said end thereof so that the free end of said socket is spread into said flared zone.

6. In a fastener assembly, a stem comprising two sections joined end by end, a tail former on the free end of one of said stem sections, the free end of the other of said stem sections being adapted for engagement with a pulling device, a tubular element on the stem section having said tail former, the bore of said tubular element being smaller than said tail former, the end on said tubular element adjacent said tail former being adapted to be enlarged thereby, means in the joined ends of said sections to interconnect them, said interconnecting means of the stem section having said tail former being an expansible socket filling said bore of said tubular element, a head on said other stem section as interconnecting means thereof embedded in said socket and interlocked therewith for joining said stem sections into a single stem resisting separation of said stem sections, so long as said socket inside said tubular element has not reached its final position, said socket being prevented from expanding by contact with the walls of said bore within said tubular element, said head having means adapted to cooperate with said socket to expand it, when the latter is free from contact with said walls, the lengths of said tubular element and of the stem section having the tail former being such that their ends at the joint of said stem sections are substantially at the same level when said end on said tubular element is enlarged by said former in said final socket position, the bore at the opposite end of said tubular element being flared outwardly permitting in said final position of said socket spreading of the free end of said socket resulting in release of said head from said socket and separation of said stem sections and simultaneously in fixing of the stem section having the tail former inside and with respect to said tubular element.

7. In a fastener assembly according to claim 6, wherein said pulling section at the joining end with said plug section has substantially the same cross section as that of said bore of said tubular element.

8. In a fastener assembly having a tubular element, a stem extending through said element and being adapted to be pulled into said element, said stem comprising a pulling section and a plug section integral with each other, said plug section having means adjacent its free end to enlarge the end of said tubular element, said sections having a weakened joint to be broken by a certain pulling force exerted on said pulling section, an expansible socket portion on the end of one of said sections, a wedge-shaped core at the end of said other section and diverging laterally and outwardly inside said expansible socket portion, said weakened joint being located in a transverse plane through said stem at the base of said expansible socket portion, the cross section of said expansible socket portion and core filling the bore of said tubular element, so that the separation of said sections at said weakened joint is resisted during the pulling of said pulling section while said socket is inside said tubular element prevented from expanding by contact with the walls of said bore within said tubular element, and permitting in the final pulling position of the stem, when said expansible socket has arrived at the end of said tubular element and is free from contact with said walls of said bore in said tubular element, separation of said sections due to spreading of said expansible socket and tearing of the stem at said weakened joint under the action of a pulling force exceeding the tensile strength of said weakened joint.

9. A stem member adapted to be pulled through a tubular rivet to upset one end thereof, said stem member having a pulling section to be operatively connected to a pulling device and a plug section having means to upset said rivet end, said sections being joined end by end, an expansible socket at the joining end of one of said sections, a head on and axially extending from the joining end of the other of said sections, said head having a tapered side converging from its outer end toward its root on said joining end of said other section and being embedded in said socket and interlocked therewith for joining said sections into a single stem member, the cross section of said socket and head in the zone of interlocking being at least of the same size as that of said plug section, said socket being capable of resisting separation of said sections, so long as said socket while inside said tubular rivet is prevented from expanding due to contact with the walls of the bore through said tubular rivet, said socket being adapted to be expanded by said head under the action of said tapered side, when said socket becomes free from contact with said walls of said bore of said tubular rivet during pulling of said pulling section by said pulling device.

References Cited in the file of this patent

UNITED STATES PATENTS

| Number | Name | Date |
|---|---|---|
| 2,317,360 | Cherry et al. | Apr. 27, 1943 |
| 2,365,834 | Olmsted | Dec. 26, 1944 |
| 2,385,831 | Mullgardt | Oct. 2, 1945 |
| 2,531,270 | Hood | Nov. 21, 1950 |
| 2,546,602 | Keating | Mar. 27, 1951 |